United States Patent [19]

Huff

[11] 4,087,485
[45] May 2, 1978

[54] POLYPROPYLENE BLENDS HAVING HIGH IMPACT STRENGTH AND IMPROVED OPTICAL PROPERTIES

[75] Inventor: Terrence Huff, Baytown, Tex.

[73] Assignee: Exxon Research & Engineering Co., Linden, N.J.

[21] Appl. No.: 714,372

[22] Filed: Aug. 16, 1976

[51] Int. Cl.$^2$ ............................................. C08L 23/16
[52] U.S. Cl. ................................................. 260/897 A
[58] Field of Search .................................... 260/897 A

[56] References Cited

U.S. PATENT DOCUMENTS

| | | | |
|---|---|---|---|
| 3,256,367 | 6/1966 | Jayne | 260/897 |
| 3,515,775 | 6/1970 | Combs et al. | 260/897 |
| 3,957,919 | 5/1976 | Von Bodungen et al. | 260/897 A |

Primary Examiner—Carman J. Seccuro
Attorney, Agent, or Firm—Ben C. Cadenhead

[57] ABSTRACT

An impact polypropylene blend having an excellent balance of overall mechanical properties, particularly high impact strength, and significantly improved optical properties, comprising about 2 to about 22% by weight of an ethylene-propylene copolymer elastomer and about 1 to about 15% by weight of a low density polyethylene which are at least partially cured in the presence of polypropylene. The high impact polypropylene blends containing about 70 to about 95% by weight polypropylene have surprisingly good optical properties and are useful for making molded or extruded high clarity articles, such as containers, films, and the like.

15 Claims, No Drawings

POLYPROPYLENE BLENDS HAVING HIGH IMPACT STRENGTH AND IMPROVED OPTICAL PROPERTIES

BACKGROUND OF THE INVENTION

1. Field Of The Invention

This invention relates to polypropylene compositions, and more particularly pertains to a novel polypropylene inpact blend having good mechanical properties along with significantly improved optical properties and a method for making same.

2. Description Of The Prior Art

Impact blends of polypropylene modified with minor amounts of certain types of amorphous ethylene-propylene copolymer elastomers and high density polyethylenes are well-known in the art. See, for example, U.S. Pat. No. 3,256,367. As described in U.S. Pat. No. 3,256,367, such modified polypropylene impact blends have improved mechanical properties, particularly improved impact strength, stiffness and heat distortion resistance as compared to unmodified polypropylene or other known polypropylene blends modified with minor amounts of rubber products, such as the above-mentioned ethylene-propylene polymer elastomers, polyisobutylene, and the like.

Furthermore, polypropylene blends comprised of polypropylene and a minor amount of a partially cured monoolefin copolymer rubber, such as an ethylene-propylene polymer elastomer, are known. As described in U.S. Pat. Nos. 3,758,643 and 3,806,558, such blends similarly have improved overall mechanical properties.

Notwithstanding the benefits which have been accomplished by the incorporation of such additives, the polypropylene impact blends referred to suffer from the common disadvantage of having extremely poor optical properties. More specifically, such blends are essentially opaque which severely restricts their use in the manufacture of molded or extruded articles or films.

U.S. Pat. No. 3,515,775 discloses a polypropylene blend of certain types of polypropylene, high density crystalline polyethylene and an amorphous ethylene-propylene copolymer which has relatively high optical properties. However, the types of polymer components employed respectively have relatively low molecular weights and, as disclosed, are useful only in the manufacture of films.

So far as is presently known, no one has previously produced a high impact polypropylene blend having both good mechanical properties, particularly high impact strength, along with acceptable optical properties for use in the manufacture of relatively high clarity molded or extruded articles and/or films.

SUMMARY OF THE INVENTION

The present invention is based upon the discovery that polypropylene compositions having a surprisingly good balance of overall mechanical properties, particularly high impact strength, and unexpectedly good optical properties, are obtained by incorporating minor amounts of a crosslinkable low density polyethylene and an ethylene-propylene copolymer elastomer having a combined ethylene content of at least 50 wt.% into a polypropylene composition and at least partially curing the low density polyethylene and elastomer components. Unexpectedly, the inclusion of cross-linkable low density polyethylene and curing it with the ethylene-propylene copolymer elastomer in the presence of the polypropylene resin significantly increases the impact strength, flexural modulus, and the like, comparable or superior to prior art polypropylene blends modified with rubber components and high density polyethylene. Moreover, the polypropylene impact blends of the invention unexpectedly have surprisingly good clarity substantially comparable to unmodified polypropylenes.

DETAILED DESCRIPTION OF THE INVENTION

More particularly, the impact polypropylene blends of the invention generally comprise from about 70% by weight to about 95% by weight polypropylene (PP), from about 1 to about 15% by weight low density polyethylene (LDPE), i.e., having a density of from about 0.915 to about 0.929 g/cc, and from about 2% to about 22% by weight of an ethylene-propylene copolymer elastomer (EPR) having a relatively high combined ethylene content of at least about 50 wt.%. More particularly, the impact blends of the invention preferably include on a percent by weight of polymer component basis about 75 wt.% to about 90 wt.% polypropylene, about 3 to about 7.5 wt.% low density polyethylene and about 7 to about 17.5 wt.% of the high combined ethylene content ethylene-propylene copolymer elastomer.

Furthermore, it is preferred to employ the elastomer component and low density component in a weight ratio of at least 1:1, EPR:LDPE, since such ratios result in a superior overall balance of good mechanical properties. The low density polyethylene and elastomer polymer components are at least partially cured in the presence of at least a portion of the polypropylene. As briefly mentioned above and described more particularly below, it has been found that by the curing of the low density polyethylene and elastomer components in the presence of the polypropylene significantly improved mechanical properties, particularly increased impact strength, tensile strength, etc., are obtained.

The polypropylenes useful in the blends of the invention are normally solid isotactic polypropylenes, i.e., polypropylenes of greater than 90% hot heptane insolubles, having a melt flow rate (MFR) of from about 0.5 to about 30 g/10 minutes (230° C., 2160 g load). The particular density of the polypropylene is not critical. As known, such isotactic polypropylenes are normally crystalline and have densities ranging from about 0.89 to about 0.91 g/cc. Preferably, a polypropylene having a melt flow rate within the range of from about 1.0 to about 20 is employed. Moreover, the blends of the invention can include more than one polypropylene component, i.e., several polypropylenes having different melt flow rates, whereby the resulting blends have melt flow rates within the above ranges.

As indicated, it is essential to employ a cross-linkable low density polyethylene, i.e., a cross-linkable polyethylene resin having a density of no more than about 0.929 g/cc, and preferably from about 0.915 to about 0.929 g/cc, in the impact blend of the present invention in order to obtain improved clarity and the desired good mechanical properties, particularly increased impact strength, surface hardness and tensile strength characteristics. Surprisingly, as illustrated in the examples set forth below, the low density polyethylene compatibilizes the mixture of the elastomer and polypropylene polymer components of the blend resulting in good clarity. Furthermore, the low density polyethylene must be cured or cross-linked with the elastomer component in accordance with the invention to provide the desired good mechanical properties.

Generally speaking, low density polyethylene is usually produced by high pressure polymerization of ethylene by a free radical reactor or tube process. Polyethylenes produced by such processes usually have a density within the above-mentioned range of 0.915 to about 0.929, a melt index within the range of about 0.2 to about 50 (190° C., 2160 g). Such methods of manufacture are well-known to those having ordinary skill in the art and, therefore, a detailed description of such methods will not be set forth. Although any of such low density polyethylenes may be employed, the preferred ones include those having a melt index (g/10 minutes MI) (190° C. 2160 g. load) within the range of from about 2 to about 30.

The ethylene-propylene copolymer elastomer employed in the blend of the invention is an essentially amorphous, random elastomeric copolymer of ethylene and propylene, with or without a copolymerizable polyene, preferably a nonconjugated diene, such as 5-ethylidene-2-norborene, 5-methylene-2-norborene, 1,4-hexadiene, etc. Examples of such ethylene-propylene elastomers (EPR) which are particularly useful in the invention include saturated ethylene-propylene binary copolymer rubbers (EPM) and ethylene-propylene-nonconjugated diene terpolymer rubbers containing about 2 to about 10 wt.% diene (EPDM) which have a Mooney viscosity within the range of about 20 to about 120 (ML 1+8' at 212° F.), preferably about 40 to about 90, and a combined ethylene content of at least 50 wt.% to about 90 wt.%, preferably about 60 wt.% to about 80 wt.%. It has been discovered that such higher combined ethylene content elastomers exert a synergistic effect with the low density polyethylene of the blends to provide significantly improved clarity without adversely effecting desired mechanical properties, such as impact strength, tensile strength, stiffness, heat distortion resistance, and the like. In fact, it has been found that this synergism results in polypropylene impact blends having optical properties substantially comparable to unmodified homopolymer polypropylenes and significantly superior to the previously mentioned polypropylene impact blends modified with cured or uncured EPR, with or without high density polyethylene, i.e., a polyethylene having a density above about 0.945 g/cc.

These relatively high ethylene-containing ethylene-propylene copolymer elastomers and the methods for making same are well-known and are readily available commercially from a number of manufacturers. Therefore, these elastomers will not be discussed more particularly in detail, except to point out that any ethylene-propylene copolymer rubber having the above characteristics may be employed in the invention.

The impact polypropylene blends of the invention can be prepared by mixing the elastomer, low density polyethylene and polypropylene components in any order with a curing agent capable of curing both the elastomer and polyethylene components, such as an organic peroxide, and subjecting the mixture to curing conditions, such as about 350° to about 400° F. for about 4 to about 7 minutes. Such mixing and curing can be accomplished using any conventional hot processing equipment in the art, such as a Banbury mixer, a roll mill, a twin screw extruder, etc. employing known thermoplastic and elastomer curing processing techniques. Preferably, a masterbatch blending technique is employed wherein the elastomer and low density polyethylene components and curing agent are mixed with a portion of the polypropylene, e.g., at about 30 to about 50 wt.% of the total weight of the masterbatch blend, and about 3 to about 12 wt.% of the total amount of polypropylene of the inventive impact blend, and subjected to the above-mentioned curing conditions to produce a cured melt-flowable thermoplastic elastomeric blend having a discontinuous elastomeric phase intimately dispersed in a continuous polypropylene phase. This masterbatch blend is then intimately mixed with homopolymer polypropylene at an elevated blending temperature at a desired ratio to produce the impact blend of the invention having the above-mentioned amounts of respective polymer components.

In carrying out the invention, the amount of curing agent employed may be varied to produce the desired amount of curing, or cross-linking, to the elastomer and crosslinkable low density polyethylene components.

As previously indicated, the curing or cross-linking of the elastomer and low density polyethylene components of the blend in the presence of the polypropylene, or at least a portion of the polypropylene, produces significantly improved mechanical properties, particularly improved impact strength, surface hardness, tensile strength, and the like, without significantly lowering the stiffness, heat distortion resistance, etc. It has been found that as the particular level of curing of these components is increased, such as by varying the amount of curing agent employed, the tensile strength and impact strength of the resulting impact blend correspondingly increases, depending upon the particular types of polymer components employed in preparing the blend. During curing the curing agent, usually referred to as a free radical generating or cross-linking agent, causes the elastomer and low density polyethylene components to cross-link to produce a discontinuous elastomer phase which is substantially non-melt-flowable depending upon the amount of curing agent employed. This discontinuous elastomer phase includes discrete particles of the cross-linked components with multiple particle to particle impingements intimately dispersed within the polypropylene.

Preferably, the curing agent is employed in an amount of about ¼ the amount required to fully cure, i.e., substantially completely cross-link, all of the ethylene-propylene rubber elastomer and cross-linkable low density polyethylene components. The amount required to provide the desired amount of curing can be readily determined by reference to the appropriate trade literature, for example literature from Hercules Incorporated, Wilmington, Delaware. Accordingly, the amount of curing agent employed usually ranges from about 0.1 to about 3, preferably from about 0.3 to about 2.0 parts per 100 parts of cross-linkable elastomer and polyethylene components. It has been found that the employement of the curing agent in such preferred amounts results in a polypropylene impact blend having an excellent balance of mechanical properties with significantly improved clarity.

Any organic peroxide capable of curing the ethylene-propylene copolymer elastomer and LDPE components can be employed as the curing agent. Examples of such useful organic peroxides include dicumyl peroxide, di-tertiary butyl peroxide, tert-butyl perbenzoate, bis($\alpha,\alpha$-dimethylbenzyl)peroxide, 2,5-bis(tert.-butylperoxy)-2,5-dimethylhexane, a,a' bis(tert.-butylperoxy)-diisopropylbenzene, and others containing tertiary carbon groups, to name a few. Mixed peroxide-filler type curing agents or packages may also be employed if desired so long as they do not adversely affect the mechanical properties and clarity of the impact blend. Examples of such curing systems or packages include Vulcup ® 40 KE, which is comprised of about 40 wt.% α-α'bis(t-butylperoxy)diisopropylbenzene on Burgess KE clay, Dicup ® which contains 40 wt.% dicumyl peroxide on Burgess KE clay, both sold by Hercules Incorporated.

Additionally, it has been discovered that triallylcyanurate significantly enhances the curing of ethylene-propylene copolymer elastomers and low density polyethylene components, as evidenced by increased resiliency, tensile strength and impact being obtained. Apparently, triallylcyanurate initiates or increases tight cross-linking of such cross-linkable polymeric materials. Accordingly, it is preferred to incorporate about 0.1 to about 0.7 wt.% triallylcyanurate, based upon the weight of elastomer and low density polyethylene polymer components present, into the polymer component mixture, whether it be the complete polymer component mixture of the invention or a masterbatch mixture, prior to subjecting the respective mixture to curing conditions.

Furthermore, it has been found that the polypropylene present during the curing or cross-linking of the ethylene-propylene copolymer elastomer and low density polyethylene tends to degrade or depolymerize. Therefore, it is preferred to incorporate a compound capable of preventing such polypropylene degradation into the elastomer, low density polyethylene, curing agent and polypropylene mixture, whether it be the entire blend of the invention or a masterbatch as previously described.

However, experiments have shown that compounds conventionally incorporated into polypropylene blends to prevent polypropylene thermal and/or ultraviolet degradation do not provide any protection to the polypropylene present during the curing of the above elastomer and LDPE. These compounds are conventionally referred to as free radical traps and include p-benzoquinone, iodine, chloranil, and the like. Additionally, free radical savenging agents or stabilizers conventionally employed to ensure termination of the action of any remaining cross-linking agent in conventional compounding techniques for curing polyethylene and/or monoolefin polymer elastomers have not been found to provide any protection to polypropylene without also adversely effecting the curing of the cross-linkable components of the blend.

It has been discovered that either sulfur and/or certain trifunctional monomers, specifically triallylcyanurate, triallylphosphate, tris (2,3-dibromopropyl) phosphate and mixtures thereof are capable of preventing degradation of the polypropylene under the above-mentioned curing conditions when incorporated into the polymer component mixture prior to curing. These components prevent polypropylene degradation by cross-linking the polypropylene molecules as they degrade. Such protection is usually obtained with the compound being incorporated into the polymer component mixture in an amount within the range of from about 0.1 to about 1.0 wt.%, based upon the weight of polypropylene present. Accordingly, it is preferred to incorporate one or more of these compounds into the mixture in such amounts, preferably by preblending with the polypropylene at a moderate temperature to ensure intimate dispersion therewith. Although all of the above compounds have been found to prevent or retard polypropylene degradation, it is particularly preferred to employ triallylcyanurate or triallylphosphate inasmuch as such compounds produce no odor.

The compositions of this invention, as other polypropylene impact blends known in the art, can contain stabilizers, antioxidants, processing aids, pigments, and other additives if desired, in normal and conventional amounts, depending upon the desired end use. The polypropylene blends of the invention can be used to produce films, filaments, rods, protective coatings, molded and extruded shaped articles, and the like, by procedures known in the art. These compositions are particularly useful for producing materials requiring clarity, such as blow-molded containers and the like.

More particularly, in preparing the polypropylene impact blends of the present invention, it is preferred to prepare a masterbatch blend wherein the elastomer and low density polyethylene components are cured to the desired level in the presence of a portion of the total amount of polypropylene. This is readily accomplished by initially preblending the elastomer, low density polyethylene and desired amount of curing agent to provide intimate and consistent dispersion and mixing of the components. A portion of the polypropylene is similarly preblended with its degradation prevention agent as previously mentioned. The two mixtures are then added to each other, preferably in an amount of about 30 to about 50 wt.% polypropylene mixture, mixed at a moderate temperature for intimate dispersion and then subjected to the above curing conditions. The resulting blend has a characteristic of a thermoplastic elastomer which is then mixed in accordance with conventional hot compounding techniques well-known in the art with the desired amount of homopolymer polypropylene to provide the impact polypropylene blends of the invention.

The following examples more particularly illustrate the nature of the invention but are not intended to be limitative thereof. In the following examples, the mechanical property evaluations were made employing the following tests.

| TEST FOR | VIA | ASTM |
|---|---|---|
| Melt Processability | Melt Flow Rate (MFR) | D 1238 L |
| Stiffness | Flexural Modulus | D 790 I.A. |
| Strength Properties | Tensile & Elongation at yield and fail | D 638 Speed D |
| Impact Strength | Notched Izod at room temp. and unnotched at 0° F −20° F and at −40° F. | D 256, Method A |

Test specimens for the above mechanical property evaluations were produced on a HPM injection molding machine, 350 tons capacity, Egan 2 inches Reciproscrew feed. Furthermore, unless specified otherwise, the blends in the examples were prepared in a Banbury Model BR (2 lbs.) mixer.

EXAMPLE I

To illustrate the effect of curing on mechanical properties, several ethylene-propylene binary copolymer elastomer-low density polyethylene-polypropylene masterbatch blends were prepared employing varying amounts of an organic peroxide curing agent. For comparison, one masterbatch blend was also prepared by employing varying amounts of polymer components.

The specific formulations for the blends prepared are set forth in the following Table 1:

TABLE 1

| Sample No. | 1 | 2 | 3 | 4 |
|---|---|---|---|---|
| Elastomer[1], wt. % | 20 | 43.3 | 44.9 | 45.5 |
| Polyethylene, wt. % | 46.3[2] | 18.6[3] | 19.3[3] | 19.5[3] |
| Polypropylene[4], wt. % | 29.9 | 34.9 | 34.9 | 34.9 |
| Other, wt. % | | | | |
| Vulcup 40 KE | 3.2 | 2.8 | 0.7 | None |
| TAC | 0.3 | 0.3 | 0.1 | None |
| Sulfur | 0.1 | 0.1 | 0.1 | 0.1 |
| Cure Level | Full | Full | ¼ | None |

[1]VISTALON ® 702 (Exxon Chemical Company U.S.A.). An ethylene-propylene copolymer elastomer; 64 wt. % combined ethylene; Mooney viscosity of 40 (ML 1+8' at 212° F.)
[2]LD 117, Exxon Chemical Company U.S.A. Density = 0.929 g/cc; 1.6 MI.
[3]LD 102, Exxon Chemical Company U.S.A. Density = 0.922 g/cc; 6.5 MI
[4]CD 460, Exxon Chemical Company U.S.A. 20 MFR polypropylene.

The masterbatch blends were prepared by initially mixing the elastomer, low density polyethylene, and cure package of Vulcup 40 KE (supra), and triallylcyanurate (TAC) in a Banbury mixer at a temperature of 250° F. for about 5 minutes for intimate blending. Similarly, the polypropylene was mixed with the sulfur in a Banbury mixer and fluxed at 370° F. for 3 minutes. The two mixtures were then added to a Banbury mixer in the designated amounts and mixed at 320° F. for 5 minutes for mixture dispersion followed by mixing at 370° F. for 7 minutes to cure the elastomer and LDPE comopnents. Sample No. 4, containing no curing agent, was similarly prepared.

Each of the above masterbatch blends were particulated and respectively mixed with a homopolymer polypropylene having a melt flow rate of 5 (E-115, Exxon Chemical Company U.S.A.) at a temperature of 400° F. by extrusion on a 2 inch Prodex extruder (through 100 mesh screen pack) and in respective amounts of 25 wt.% masterbatch blend to 75 wt.% homopolymer polypropylene. The mechanical properties of the resulting impact polypropylene blends are set forth in the following Table 2.

TABLE 2

| Sample No. | 1 | 2 | 3 | 4 |
|---|---|---|---|---|
| Masterbatch Blend, wt. % | 25 | 25 | 25 | 25 |
| Cure Package | Full | Full | ¼ | None |
| Polypropylene[1], wt. % | 75 | 75 | 75 | 75 |
| Properties | | | | |
| Flex. Mod. × 10⁻³ | 133,800 | 129,300 | 142,400 | 145,400 |
| MFR | 3.0 | 3.1 | — | — |
| Tensile, Yield | 3867 | 3809 | 3939 | 3881 |
| %, Elong., Yield | 19 | 17 | 16 | 16 |
| Tensile, Fail | 3026 | 3328 | 1443 | 1496 |
| %, Elong., Fail | 520 | 637 | 308 | 385 |
| R. T. Notch. | 1.1 | 2.3 | 1.3 | 1.0 |
| R. T. Unnotched | DNB | DNB | DNB | 30.4 |
| Unnotched At: | | | | |
| 0° F. | 10.7 | 19.9 | 20.8 | 11.0 |
| −20° F. | 9.2 | 10.0 | 15.8 | 8.9 |
| −40° F. | 10.0 | 11.8 | 11.6 | 7.8 |

[1]E-115, Exxon Chemical Gompany U.S.A. 5 MFR Homopolymer Polypropylene.

As illustrated by a comparison of Samples 2 and 3 to Sample 4, curing of the elastomer and polyethylene components, either fully or partially in accordance with the present invention, provides substantially increased impact strength and tensile strength at fail with little significant loss in flexural modulus. Furthermore, a comparison of Sample 1 to Samples 2 and 3 shows the improved mechanical properties obtained by employing the preferred elastomer to LDPE ratio of at least 1:1.

Each of the above samples were also tested for optical properties. For these tests, each sample was injection molded to produce circular test chips. A "see-through" test was then carried out by setting a chip of each sample in a paperholder and looking through them for background definition. The background definitions observed through all the chips were somewhat poor; however, they are substantially comparable to that observed through a comparably sized chip of unmodified homopolymer polypropylene. A chip from each sample was also employed for a "contact" clarity test. This test was carried out by placing the chips in contact with an article having printed matter and observing whether the printed matter could be seen through the chips. The contact clarity of all of the samples was relatively good inasmuch as the printed matter was quite clear through them.

EXAMPLE II

For this example, an impact polypropylene blend containing fully cured EPR and LDPE components was prepared in accordance with the masterbatch technique described in Example I from the following formula:

| Composition | Wt. %, Total Formula |
|---|---|
| Elastomer | 43.3 |
| LDPE | 18.6 |
| PP | 34.9 |
| Vulcup 40 KE | 2.8 |
| TAC | 0.3 |
| Sulfur | 0.1 |

An impact blend was prepared as described in Example I by mixing 25 wt.% of the masterbatch blend with 75 wt.% of a homopolymer of polypropylene (E-115, supra) having a MFR of 5.

Two other impact polypropylene blends were prepared by employing a conventional masterbatching technique with masterbatch blends respectively comprised of 40 wt.% ethylene-propylene copolymer rubber, 40 wt.% high density polyethylene and 20 wt.% polypropylene. These masterbatch blends were similarly mixed with 5 MFR homopolymer polypropylene at a level of 25 wt.% masterbatch blend, 75 wt.% polypropylene, as described above. The mechanical properties and polymer components of all of the impact blends prepared are set forth in the following Table 3.

TABLE 3

| Sample No. | 1 | 2 | 3 |
|---|---|---|---|
| Masterbatch Composition | | | |
| Elastomer, wt. % | 40[1] | 40[2] | 43.3[3] |
| Polyethylene, wt. % | 40[4] | 40[4] | 18.6[5] |
| Polypropylene, wt. % | 20[6] | 20[6] | 34.9[7] |
| Other, wt. % | | | |
| Vulcup 40 KE | — | — | 2.8 |
| TAC | — | — | 0.3 |
| Sulfur | — | — | 0.1 |
| Impact Blend | | | |
| wt. % Masterbatch/PP[8] | 25/75 | 25/75 | 25/75 |
| Calculated: | | | |
| Elastomer, wt. % | 10 | 10 | 11.4 |
| Polyethylene, wt. % | 10 | 10 | 4.9 |
| Properties | | | |
| Flex. Mod. × 10⁻³ | 142.0 | 146.4 | 133.7 |
| Tensile, Yield | 4753 | 4706 | 4662 |
| % Elong., Yield | — | — | — |
| Tensile, Fail | 3441 | 3595 | 3842 |
| % Elong., Fail | 116 | 234 | 172 |
| R. T. Notched Izod | 4.0 | 12.1 | 7.4 |
| Unnotched Izods at | | | |
| 0° F. | 32.9 | 37.9 | 22.4 |
| −20° F. | 22.6 | 27.7 | 20.5 |
| −40° F. | 15.9 | 20.0 | 17.6 |
| MFR | 2.7 | 2.5 | 1.8 |

TABLE 3-continued

| Sample No. | 1 | 2 | 3 |
|---|---|---|---|
| Clarity | opaque | opaque | clear |

[1] VISTALON ® 404 (Exxon Chemical Company U.S.A.) An ethylene-propylene copolymer rubber; Mooney viscosity = 40 (1+8' at 212° F.); 40 wt. % combined ethylene.
[2] VISTALON ® 606 (Exxon Chemical Company U.S.A.) An ethylene-propylene copolymer rubber; Mooney viscosity = 80 (1+8' at 212° F.); 50 wt. % combined ethylene.
[3] VISTALON ® 3708 (Exxon Chemical Company U.S.A.) EPDM; Mooney Viscosity = 75 (1+8' at 212° F.); 64 wt. % combined ethylene; 3.4 wt. % diene (5-ethylidene-2-norborene)
[4] High density polyethylene, Allied AA 60003, (Allied Chemical Company) Density = 0.960; MI = 0.3
[5] 0.5 MI LDPE (LD 102, Exxon Chemical Company U.S.A.) Density = 0.922 g/cc; 6.5 MI
[6] 5 MFR PP (E-115, Exxon Chemical Company U.S.A.)
[7] 20 MFR PP (CD 460, Exxon Chemical Company U.S.A.)
[8] 5 MFR PP (E-115, Exxon Chemical Company U.S.A.)

A comparison of Sample No. 3 to Sample Nos. 1 and 2 illustrates that polypropylene impact blends prepared in accordance with the present invention have mechanical properties substantially comparable to impact blends containing high density polyethylene and ethylene-propylene polymer elastomer as modifying agents. On the other hand, as shown, the impact blend of the present invention was clear while those containing HDPE were opaque. Accordingly, the impact blends of the invention have the added advantage of clarity without any loss of good mechanical properties required for use in the manufacture of molded or extruded articles and/or films.

Various modifications of this invention can be made or followed in light of this disclosure and the discussion set forth above without departing from the spirit and scope thereof.

What is claimed is:

1. A polypropylene blend having high impact strength and improved optical properties, comprising: about 70% to about 95% by weight of a polypropylene component, about 1% to about 15% by weight of a low density polyethylene component, said polyethylene having a density of no more than about 0.929 g/cc, and about 2% to about 22% by weight of an ethylene-propylene copolymer elastomer component having a combined ethylene content of at least 50 wt.%, based upon the weight of the elastomer component, the low density polyethylene and elastomer components being at least partially cured in the presence of at least a portion of the polyethylene.

2. The polypropylene blend of claim 1, wherein the polypropylene component is an isotactic polypropylene of greater than 90% hot heptane insolubles having a melt flow rate within the range of from about 0.5 to about 30.

3. The polypropylene blend of claim 1, wherein the ethylene-propylene copolymer elastomer component is selected from the group consisting of an ethylene-propylene binary copolymer, an ethylene-propylene-nonconjugated diene terpolymer elastomer and mixtures thereof having a combined ethylene content of from about 60 to about 80 wt.% and a Mooney viscosity of from about 20 to about 120 (M.L. 1+8' at 212° F.).

4. The polypropylene blend of claim 1, wherein the low density polyethylene component is a polyethylene having a density of about 0.915 to about 0.929 g/cc and a melt index of from about 2 to about 30.

5. The polypropylene blend of claim 1, wherein the low density polyethylene and ethylene-propylene copolymer elastomer components are cured with an organic peroxide, said organic peroxide being employed in an amount of from about ¼ to a total amount required for substantially fully curing said components in the presence of said portion of polypropylene.

6. The blend of claim 1, wherein the portion of polypropylene cured in the presence of the low density polyethylene and ethylene-propylene copolymer elastomer components includes from about 0.1% to about 1.0% by weight, based upon the weight of said polypropylene portion, of a compound capable of preventing substantial degradation of the polypropylene with the elastomer and polyethylene being cured in the presence thereof, said compound being selected from the group consisting of sulfur, triallylcyanurate, triallylphosphate, tris (2,3-dibromopropyl) phosphate and mixtures thereof.

7. The polypropylene blend of claim 1, wherein the elastomer and low density polyethylene components are cured in the presence of from about 0.1 to about 0.5% by weight triallylcyanurate, based upon the weight of said elastomer and low density polyethylene components.

8. A method for preparing a polypropylene blend having high impact strength and improved optical properties, said method comprising:
mixing about 2 to about 22% by weight of an ethylene-propylene copolymer elastomer having a combined ethylene content of at least 50% by weight, based upon the weight of said elastomer, about 1 to about 15% by weight of a low density polyethylene having a density of no more than about 0.929 g/cc and an organic peroxide curing agent with about 70 to about 95% by weight of polypropylene; and
subjecting the mixture to curing conditions, said organic peroxide curing agent being present in an amount of from about ¼ to the total amount required to fully cure all of the elastomer and low density polyethylene in the mixture.

9. The method of claim 8, wherein the polypropylene is an isotactic polypropylene of greater than 90% hot heptane insolubles having a melt flow rate of from about 0.5 to about 30.

10. The method of claim 8, wherein the ethylene-propylene copolymer elastomer has a combined ethylene content of from about 60 to about 80 wt.%, based upon the weight of said elastomer and a Mooney viscosity of from about 20 to about 120 (M.L. 1+8' at 212° F.) and is selected from the group consisting of an ethylene-propylene binary copolymer, and ethylene-propylene-nonconjugated diene terpolymer and mixtures thereof.

11. The method of claim 8, wherein the low density polyethylene has a density of from about 0.915 to about 0.929 g/cc and a melt index of from about 2 to about 30.

12. The method of claim 8, wherein the elastomer, low density polyethylene and curing agent are initially mixed with about 3 to about 12 wt.% of the total amount of polypropylene of the blend and heated at said temperature for said period of time and then mixing the resulting mixture with the remainder of the polypropylene of the blend.

13. The method of claim 12, wherein the portion of polypropylene mixed with the elastomer, low density polyethylene and curing agent is initially mixed with from about 0.1 to about 1.0 wt.%, based upon the weight of said polypropylene portion, of a compound selected from the group consisting of sulfur, triallylcyanurate, triallylphosphate, tris (2,3-dibromopropyl) phosphate and mixtures thereof.

14. The method of claim 13, wherein the curing agent is present in an amount of from about 0.2 to about 0.3% by weight, based upon the weight of the elastomer and low density polyethylene present.

15. The method of claim 14, wherein about 0.1 to about 0.5 wt.% triallylcyanurate, based upon the weight of the elastomer and low density polyethylene present, is mixed therewith prior to subjecting the mixture to said elevated temperature for said period of time.

* * * * *